United States Patent
Liu et al.

(10) Patent No.: US 12,266,965 B2
(45) Date of Patent: Apr. 1, 2025

(54) POWER BATTERY CHARGING METHOD, MOTOR CONTROL CIRCUIT, AND VEHICLE

(71) Applicant: BYD COMPANY LIMITED, Shenzhen (CN)

(72) Inventors: Changjiu Liu, Shenzhen (CN); Hua Pan, Shenzhen (CN); Ronghua Ning, Shenzhen (CN); Yang Liu, Shenzhen (CN); Ning Yang, Shenzhen (CN)

(73) Assignee: BYD COMPANY LIMITED, Shenzhen (CN)

(*) Notice: Subject to any disclaimer, the term of this patent is extended or adjusted under 35 U.S.C. 154(b) by 0 days.

(21) Appl. No.: 18/505,826

(22) Filed: Nov. 9, 2023

(65) Prior Publication Data
US 2024/0072562 A1    Feb. 29, 2024

Related U.S. Application Data

(63) Continuation of application No. 17/416,745, filed as application No. PCT/CN2019/125977 on Dec. 17, 2019, now Pat. No. 11,876,396.

(30) Foreign Application Priority Data

Dec. 21, 2018    (CN) .................... 201811574168.8

(51) Int. Cl.
*H02J 7/00*        (2006.01)
*H02J 7/04*        (2006.01)
(Continued)

(52) U.S. Cl.
CPC .......... *H02J 7/007182* (2020.01); *H02J 7/04* (2013.01); *H02P 27/08* (2013.01); *B60L 15/20* (2013.01); *B60L 50/51* (2019.02)

(58) Field of Classification Search
CPC .......... H02J 7/00; H02J 7/007182; H02J 7/04; B60L 50/51; B60L 15/20; H02P 27/08
See application file for complete search history.

(56) References Cited

U.S. PATENT DOCUMENTS

| | | |
|---|---|---|
| 6,476,571 B1 | 11/2002 | Sasaki |
| 2012/0007551 A1 | 1/2012 | Song et al. |

(Continued)

FOREIGN PATENT DOCUMENTS

| | | |
|---|---|---|
| CN | 2863540 Y | 1/2007 |
| CN | 101027834 A | 8/2007 |

(Continued)

OTHER PUBLICATIONS

The World Intellectual Property Organization (WIPO) International Search Report for PCT/CN2019/125977 Mar. 25, 2020 6 pages (with translation).

*Primary Examiner* — Robert L Deberadinis
(74) *Attorney, Agent, or Firm* — Wenye Tan (57) ABSTRACT

A motor control circuit includes a first switch module, a three-phase inverter, and a control module. A power supply module, the first switch module, the three-phase inverter, and a three-phase alternating current motor form a current loop; midpoints of three phase legs of the three-phase inverter are respectively connected to three phase coils of the three-phase alternating current motor; the three-phase alternating current motor is configured to input or output a current by using a wire N extending from a connection point (Continued)

of the three phase coils; the control module is connected to the three-phase inverter, first switch module, three-phase alternating current motor, and power supply module; the control module is configured to control the three-phase inverter to enable the motor control circuit to receive a voltage of the power supply module and output a direct current, and to boost a voltage of the power supply module.

18 Claims, 5 Drawing Sheets

(51) Int. Cl.
    *H02P 27/08*     (2006.01)
    *B60L 15/20*     (2006.01)
    *B60L 50/51*     (2019.01)

(56) References Cited

U.S. PATENT DOCUMENTS

| | | |
|---|---|---|
| 2012/0019174 A1 | 1/2012 | Mahlein et al. |
| 2013/0147431 A1 | 6/2013 | Lim et al. |
| 2016/0173018 A1 | 6/2016 | Nondahl et al. |

FOREIGN PATENT DOCUMENTS

| | | |
|---|---|---|
| CN | 101499771 A | 8/2009 |
| CN | 102365188 A | 2/2012 |
| CN | 102844961 A | 12/2012 |
| CN | 202906833 U | 4/2013 |
| CN | 104426217 A | 3/2015 |
| CN | 204539041 U | 8/2015 |
| CN | 105244982 A | 1/2016 |
| CN | 105691217 A | 6/2016 |
| CN | 207241447 U | 4/2018 |
| CN | 207481695 U | 6/2018 |
| CN | 108725235 A | 11/2018 |
| CN | 110015112 A | 7/2019 |
| EP | 0834977 A2 | 4/1998 |
| EP | 1034968 A1 | 9/2000 |
| EP | 3902087 A4 | 10/2021 |
| JP | H05207664 A | 8/1993 |
| JP | H08242587 A | 9/1996 |
| JP | H1198713 A | 4/1999 |
| JP | 2000324857 A | 11/2000 |
| JP | 2005184947 A | 7/2005 |
| JP | 2009268277 A | 11/2009 |
| JP | 2011051545 A | 3/2011 |
| JP | 2013123362 A | 6/2013 |
| JP | 2018102069 A | 6/2018 |
| KR | 20120106457 A | 9/2012 |
| KR | 20160140292 A | 12/2016 |
| TW | 200948634 A | 12/2009 |

POWER BATTERY CHARGING METHOD, MOTOR CONTROL CIRCUIT, AND VEHICLE

CROSS-REFERENCE TO RELATED APPLICATIONS

The present application is a continuation of U.S. patent application Ser. No. 17/416,745, filed on Jun. 21, 2021, which is a national phase entry under 35 U.S.C. § 371 of International Application No. PCT/CN2019/125977, filed on Dec. 17, 2019, which is based upon and claims priority to Chinese Patent Application No. 201811574168.8, filed on Dec. 21, 2018, content of all of which is incorporated herein by reference in its entirety.

FIELD

The present disclosure relates to the technical field of motor control and, in particular, to a power battery charging method, a motor control circuit, and a vehicle.

BACKGROUND

With development and rapid popularization of electric vehicles, charging technologies of power batteries of the electric vehicles have become increasingly important. The charging technologies need to meet needs of different users, and adaptability and compatibility of the power batteries of the electric vehicles and charging piles.

Currently, manners of direct current charging of the power batteries are generally classified into two manners: a manner of direct charging and a manner of boost charging. The direct charging means that positive and negative electrodes of a charging pile are directly connected to positive and negative bus bars of the power battery through a contactor or a relay to directly charge the battery, without an intermediate boost or buck circuit; and boost charging means that a DC/DC bridge circuit capable of bidirectional buck-boost is added and connected to the positive and negative bus bars between the charging pile and the power battery in parallel.

For the direct charging, when the maximum output voltage of the charging pile is lower than a voltage of the power battery, the charging pile cannot charge the battery; and for the boost charging, a boost circuit including a DC/DC bridge circuit, an inductor, and a corresponding control detection circuit further separately need to be added, which increases a volume and costs of an entire apparatus.

SUMMARY

A purpose of the present disclosure is to provide a power battery charging method, a motor control circuit, and a vehicle, to resolve a problem in the related art that a volume and costs of an entire apparatus are increased because a boost circuit needs to be added when a power battery is charged in a manner of boost charging.

The present disclosure is implemented as follows: According to a first aspect of the present disclosure, a motor control circuit is provided, including a first switch module, a three-phase inverter, and a control module, where a power supply module, the first switch module, the three-phase inverter, and a three-phase alternating current motor form a current loop, midpoints of three phase legs of the three-phase inverter are respectively connected to three phase coils of the three-phase alternating current motor, the three-phase alternating current motor inputs or outputs a current by using a wire N extending from a connection point of the three phase coils, the control module is separately connected to the three-phase inverter, the first switch module, the three-phase alternating current motor, and the power supply module, and the control module controls the three-phase inverter, so that the motor control circuit receives a voltage of the power supply module and outputs a direct current.

According to a second aspect of the present disclosure, a power battery charging method is provided, based on the motor control circuit according to the first aspect, where the charging method includes:

obtaining a voltage of the power supply module and a voltage of a power battery, and selecting a charging manner based on the voltage of the power supply module and the voltage of the power battery, where the charging manner includes boost charging manner and direct charging manner; and controlling the first switch module and the second switch module to close so that the power supply module outputs a direct current, and controlling the three-phase inverter so that the power supply module charges the power battery in the selected charging manner.

According to a third aspect of the present disclosure, a vehicle is provided, where the vehicle includes the motor control circuit according to the first aspect.

The present disclosure provides a power battery charging method, a motor control circuit, and a vehicle. The motor control circuit includes a first switch module, a three-phase inverter, and a control module, where a power supply module, the first switch module, the three-phase inverter, and a three-phase alternating current motor form a current loop, midpoints of three phase legs of the three-phase inverter are respectively connected to three phase coils of the three-phase alternating current motor, the three-phase alternating current motor inputs or outputs a current by using a wire N extending from a connection point of the three phase coils, the control module is separately connected to the three-phase inverter, the first switch module, the three-phase alternating current motor, and the power supply module, and the control module controls the three-phase inverter, so that the motor control circuit receives a voltage of the power supply module and outputs a direct current. In the technical solutions of the present disclosure, the wire N extends from the three-phase alternating current motor, and forms different charging loops with the three-phase inverter, the three-phase alternating current motor, and the power battery. When the control module detects that a highest output voltage of the power supply module is not higher than the voltage of the power battery, the original three-phase inverter and three-phase alternating current motor are adopted to boost the voltage of the power supply module before the power battery is charged; or when the control module detects that a highest output voltage of the power supply module is higher than the voltage of the power battery, the power battery is charged directly. In this case, the power battery can be charged regardless of the voltage of the power supply module, and thereby achieving robust compatibility and adaptability. In addition, no extra external boost circuit needs to be added, which reduces costs of an external circuit.

BRIEF DESCRIPTION OF THE DRAWINGS

To describe the technical solutions of the embodiments of the present disclosure more clearly, the following briefly introduces the accompanying drawings for describing the embodiments. Apparently, the accompanying drawings in the following description show only some embodiments of the present disclosure, and a person of ordinary skill in the art may still derive other drawings from these accompanying drawings without creative efforts.

DETAILED DESCRIPTION

To make the objectives, technical solutions, and advantages of the present disclosure clearer and more comprehensible, the following further describes the present disclosure in detail with reference to the accompanying drawings and embodiments. It is to be understood that the disclosed embodiments described herein are merely used for describing the present disclosure, but are not intended to limit the present disclosure.

To describe the technical solutions in the present disclosure, the following will be described by using various embodiments.

Figure 1:
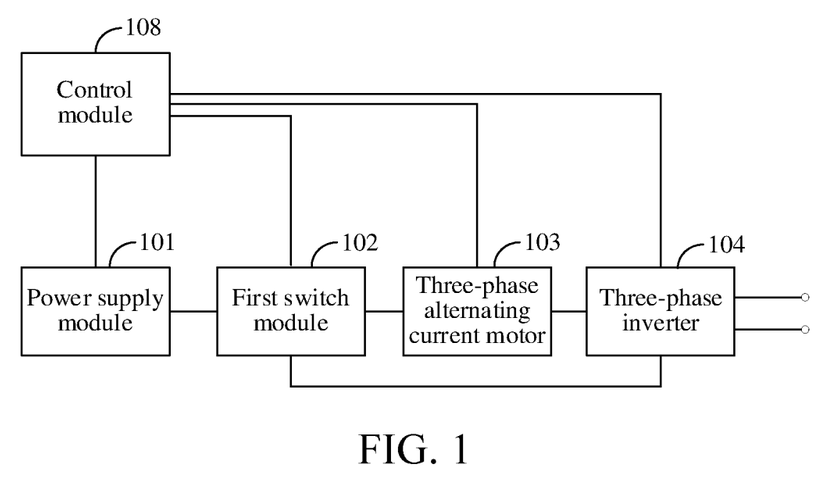
FIG. 1 is a schematic structural diagram of a motor control circuit according to one embodiment of the present disclosure.

One embodiment of the present disclosure provides a motor control circuit. As shown in FIG. 1, the motor control circuit includes a first switch module 102, a three-phase inverter 104, and a control module 108, where a power supply module 101, the first switch module 102, the three-phase inverter 104, and a three-phase alternating current motor 103 forms a current loop, midpoints of three phase legs of the three-phase inverter 104 are respectively connected to three phase coils of the three-phase alternating current motor 103, the three-phase alternating current motor 103 inputs or outputs a current by using a wire N extending from a connection point of the three phase coils, the control module 108 is separately connected to the three-phase inverter 104, the first switch module 102, the three-phase alternating current motor 103, and the power supply module 101, and the control module 108 controls the three-phase inverter 104, so that the motor control circuit receives a voltage of the power supply module 101 and outputs a direct current.

Power provided by the power supply module 101 may be in power forms such as a direct current provided by a direct current charging pile, a direct current outputted after rectification of a single-phase or three-phase alternating current charging pile, electric energy generated by a fuel battery, or a direct current obtained after a controller of a generator rectifies electricity generated by the generator driven when a range extender such as the motor rotates. The first switch module 102 is configured to connect the power supply module 101 to a circuit based on a control signal, so that the power supply module 101, the first switch module 102, the three-phase alternating current motor 103, and the three-phase inverter form a current loop. The first switch module 102 may be a switch disposed at a positive electrode and/or a negative electrode of the power supply module 101 to implement on-off control of an output current of the power supply module 101. The three-phase alternating current motor 103 includes three phase coils, and the three phase coils are connected to a midpoint. The three-phase alternating current motor 103 may be a permanent-magnet synchronous motor or asynchronous motor, and the three-phase alternating current motor 103 is a three-phase four-wire system, that is, a wire N extending from a connection point of the three phase coils is configured to input or output a current. The three-phase inverter 104 includes six power switch units, and the power switch may be a device type such as a transistor, an IGBT, and a MOS transistor. Two power switch units form one phase leg, a total of three phase legs are formed, and a connection point of two power switch units in each phase leg is connected to one phase coil in the three-phase alternating current motor 103. The control module 108 may collect a voltage, a current, and temperature of the power battery 106, a phase current of the three-phase alternating current motor 103, and a voltage of the power supply module 101. The control module 108 may include a controller of an entire vehicle, a control circuit of a motor controller, and a circuit of a BMS battery manager that are connected through a CAN wire. Different modules in the control module 108 control on-off of the power switches in the three-phase inverter 104 and on-off of the first switch module 102 based on obtained information to implement closing of different current loops.

When the first switch module 102 is controlled to connect the power supply module 101 to the circuit, for example, when a direct current charging terminal is plugged into a direct current charging interface of the vehicle, the control module 108 compares the voltage of the power supply module 101 with a voltage of a to-be-charged component. For example, the to-be-charged component may be a rechargeable battery, and a different charging manner is selected to charge the power battery based on a comparison result. When the voltage of the power supply module 101 is not higher than the voltage of the power battery, the power battery may be charged in a direct current boost charging manner. Because the three phase coils of the three-phase alternating current motor 103 may store electric energy, the first switch module 102 and a second switch module 105 may be controlled to close, and the three-phase inverter 104 may be used, so that the power supply module 101, the three-phase inverter 104, and the three phase coils of the three-phase alternating current motor 103 form an inductive energy storage loop. Even if the power supply module 101 first charges the three phase coils of the three-phase alternating current motor 103, and the power battery 106 is then charged by using the power supply module 101 and the three phase coils of the three-phase alternating current motor 103, because the three phase coils of the three-phase alternating current motor 103 also output a voltage at this time, the voltage outputted by the power supply module 101 is superimposed with the voltage outputted by the three phase coils, so that the voltage of the power supply module 101 is boosted, thereby normally charging the power battery. When the control module 108 detects that the voltage of the power supply module 101 is higher than the voltage of the power battery, the control module 108 controls the first switch module 102 to close, so that an external power supply charges the power battery by using the three-phase alternating current motor 103 and the three-phase inverter 104.

In the embodiments of the present disclosure, the wire N extends from the three-phase alternating current motor, and forms different charging loops with the three-phase inverter, the three-phase alternating current motor, and the power battery. When the control module detects that a highest output voltage of the power supply module is not higher than the voltage of the power battery, the original three-phase inverter and three-phase alternating current motor are adopted to boost the voltage of the power supply module before the power battery is charged; or when the control module detects that a highest output voltage of the power supply module is higher than the voltage of the power battery, the power battery is charged directly. In this case, the power battery can be charged regardless of the voltage of the power supply module, and thereby achieving robust compatibility and adaptability. In addition, no extra external boost circuit needs to be added, which reduces costs of an external circuit.

Figure 2:
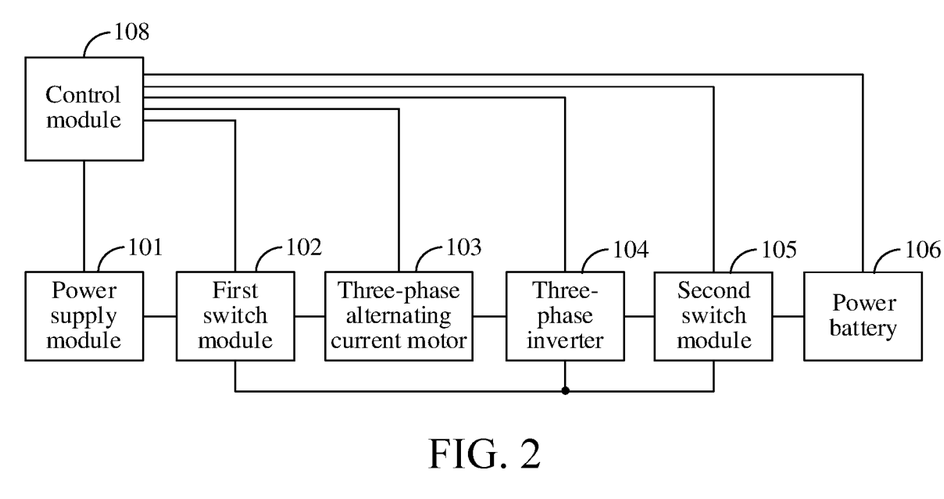
FIG. 2 is another schematic structural diagram of a motor control circuit according to one embodiment of the present disclosure.

As shown in FIG. 2, in an embodiment of the present disclosure, the motor control circuit further includes a second switch module 105, the three-phase inverter 104 is connected to a power battery 106 by the second switch module 105, and the second switch module 105 is connected to the control module 108.

The second switch module 105 is configured to connect or disconnect the power battery 106 to or from a circuit.

In a first implementation of the second switch module 105, the second switch module 105 is a third switch, and the third switch is connected between a first terminal of the three-phase inverter 104 and a positive electrode of the power battery 106.

In a second implementation of the second switch module 105, the second switch module 105 is a fourth switch, and the fourth switch is connected between a second terminal of the three-phase inverter 104 and a negative electrode of the power battery.

In a third implementation of the second switch module 105, the second switch module 105 includes the third switch and the fourth switch.

In a first implementation of the first switch module, the first switch module 102 is a first switch, and the first switch is connected between a positive electrode of the power supply module 101 and the connection point of the three phase coils of the three-phase alternating current motor 103.

In a second implementation of the first switch module 102, the first switch module 102 is a second switch, and the second switch is connected between a negative electrode of the power supply module 101 and the second terminal of the three-phase inverter 104.

In a third implementation of the first switch module 102, the first switch module 102 includes the first switch and the second switch.

A connection relationship in this implementation may be as follows: A first terminal and a second terminal of the first switch module 102 are connected to the positive electrode and the negative electrode of the power supply module 101, a third terminal of the first switch module 102 is connected to the connection point of the three phase coils in the three-phase alternating current motor 103, a fourth terminal of the first switch module 102 is connected to the second terminal of the three-phase inverter 104 and a second terminal of the second switch module 105, the first terminal of the three-phase inverter 104 is connected to a first terminal of the second switch module 105, and a third terminal and a fourth terminal of the second switch module 105 are connected to the positive electrode and the negative electrode of the power battery 106.

The first switch module 102 includes a first switch and a second switch, and the second switch module 105 includes a third switch and a fourth switch. A first terminal and a second terminal of the first switch are respectively the first terminal and the third terminal of the first switch module 102, and a first terminal and a second terminal of the second switch are respectively the second terminal and the fourth terminal of the first switch module 102, a first terminal and a second terminal of the third switch are respectively the first terminal and the third terminal of the second switch module 105, and a first terminal and a second terminal of the fourth switch are respectively the second terminal and the fourth terminal of the second switch module 105.

For the three-phase inverter 104, specifically, the three-phase inverter 104 includes a first power switch unit, a second power switch unit, a third power switch unit, a fourth power switch unit, a fifth power switch unit, and a sixth power switch unit, and control terminal of each power switch unit is connected to the control module 108. Input terminals of the first power switch unit, the third power switch unit, and the fifth power switch unit are jointly connected to form the first terminal of the three-phase inverter 104, and output terminals of the second power switch unit, the fourth power switch unit, and the sixth power switch unit are jointly connected to form the second terminal of the three-phase inverter 104. A first coil of the three-phase alternating current motor 103 is connected to the output terminal of the first power switch unit and the input terminal of the fourth power switch unit. A second coil of the three-phase alternating current motor 103 is connected to the output terminal of the third power switch unit and the input terminal of the sixth power switch unit. A third coil of the three-phase alternating current motor 103 is connected to the output terminal of the fifth power switch unit and the input terminal of the second power switch unit.

The first power switch unit and the fourth power switch unit in the three-phase inverter 104 form an A-phase leg, the third power switch unit and the sixth power switch unit form a B-phase leg, and the input terminal of the fifth power switch unit and the second power switch unit form a C-phase leg. A control manner of the three-phase inverter 104 may be a combination of any one or more of the following: for example, a total of 7 heating control methods for any phase leg, or any two phase legs, and three phase legs of the three phases A, B, and C, which is flexible and simple. The switching of the phase legs can help select high, medium or low heating power. For example, for low-power heating, a power switch of any phase leg may be selected for control, and the three phase legs may be switched in turn. For example, the A-phase leg first independently operates, to control the first power switch unit and the fourth power switch unit to perform heating for a period of time; then the B-phase leg independently operates, to control the third power switch unit and the sixth power switch unit to perform heating for the same period of time; and then the C-phase leg independently operates, to control the fifth power switch unit and the second power switch unit to perform heating for the same period of time, and then the C-phase leg is switched to the A-phase leg for operating cyclically, so that the three-phase inverter 104 and the three phase coils are electrified and heated in turn, to make the three-phase heating more balanced. For example, for medium power heating, power switches of any two phase legs may be selected for control, and the three phase legs can be switched in turn. For example, the A-phase and B-phase legs operate first to control the first power switch unit, the fourth power switch unit, the third power switch unit, and the sixth power switch unit to perform heating for a period of time; then the B-phase and C-phase legs operate to control the third power switch unit, the sixth power switch unit, the fifth power switch unit, and the second power switch unit to perform heating for the same period of time; and then the C-phase and A-phase legs operate to control the fifth power switch unit, the second power switch unit, the first power switch unit, and the fourth power switch unit to perform heating for the same period of time, and then the C-phase and A-phase legs are switched to the A-phase and B-phase legs for operating cyclically, to make heating of the three-phase inverter 104 and three phase coils more balanced. For example, for high-power heating, power switches of the three phase legs may be selected for control, and because a three-phase loop is theoretically balanced, the three-phase current is balanced, and as a result, heating of the three-phase inverter 104 and the three phase coils is balanced and the three-phase currents are basically the direct current, and average values are basically the same; and because three-phase winding groups are symmetrical, three-phase synthetic magnetomotive force inside the motor is basically zero in this case, and therefore, the stator magnetic field is basically zero, and basically, no torque is generated for the motor, which helps greatly reduce stress of a drive system.

Figure 3:
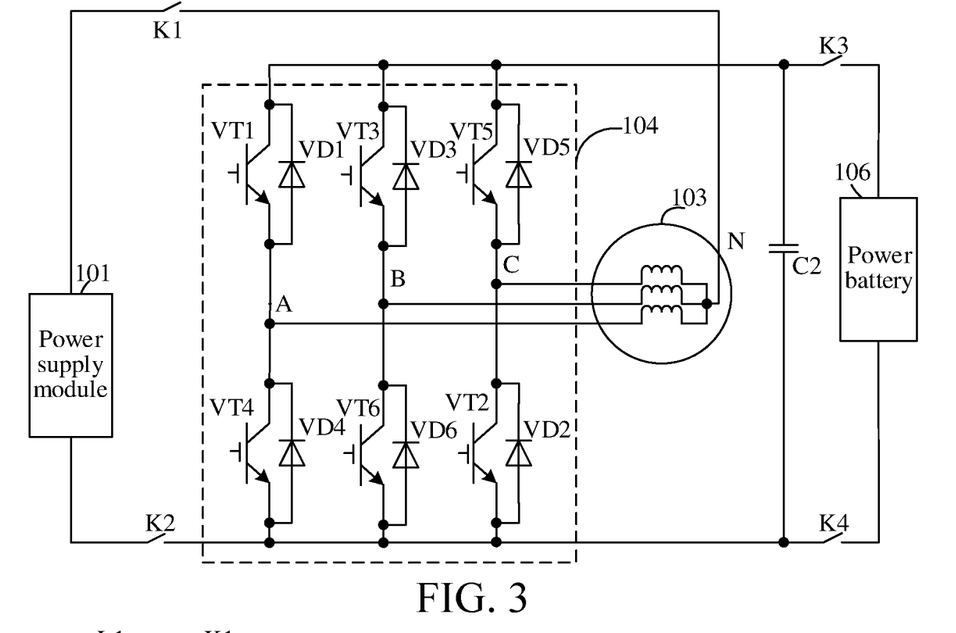
FIG. 3 is a circuit diagram of a motor control circuit according to one embodiment of the present disclosure.

The technical solutions of the present disclosure are described in detail below by using a specific circuit structure:

FIG. 3 is a schematic circuit diagram of a motor control circuit according to the present disclosure. For ease of description of the motor control circuit, in the foregoing figure, other electrical devices are omitted, and only the power battery 106, the three-phase inverter 104, and the three-phase alternating current motor 103 are taken into consideration. The first switch module 102 includes a switch K1 and a switch K2. The second switch module 105 includes a switch K3 and a switch K4. In the three-phase inverter 104, the first power switch unit includes a first upper phase leg VT1 and a first upper bridge diode VD1, the second power switch unit includes a second lower phase leg VT2 and a second lower bridge diode VD2, the third power switch unit includes a third upper phase leg VT3 and a third upper bridge diode VD3, the fourth power switch unit includes a fourth lower phase leg VT4 and a fourth lower bridge diode VD4, the fifth power switch unit includes a fifth upper phase leg VT5 and a fifth upper bridge diode VD5, and the sixth power switch unit includes a sixth lower phase leg VT6 and a sixth lower bridge diode VD6. The three-phase alternating current motor 103 is a three-phase four-wire system, and a wire N extends from the connection point of the three phase coils, and the wire N is connected to the switch K1. The three phase coils are separately connected to the upper and lower phase legs of the phases A, B, and C in the three-phase inverter 104, and both terminals of the power battery 106 are also connected to a capacitor C2 in parallel.

Figure 4:
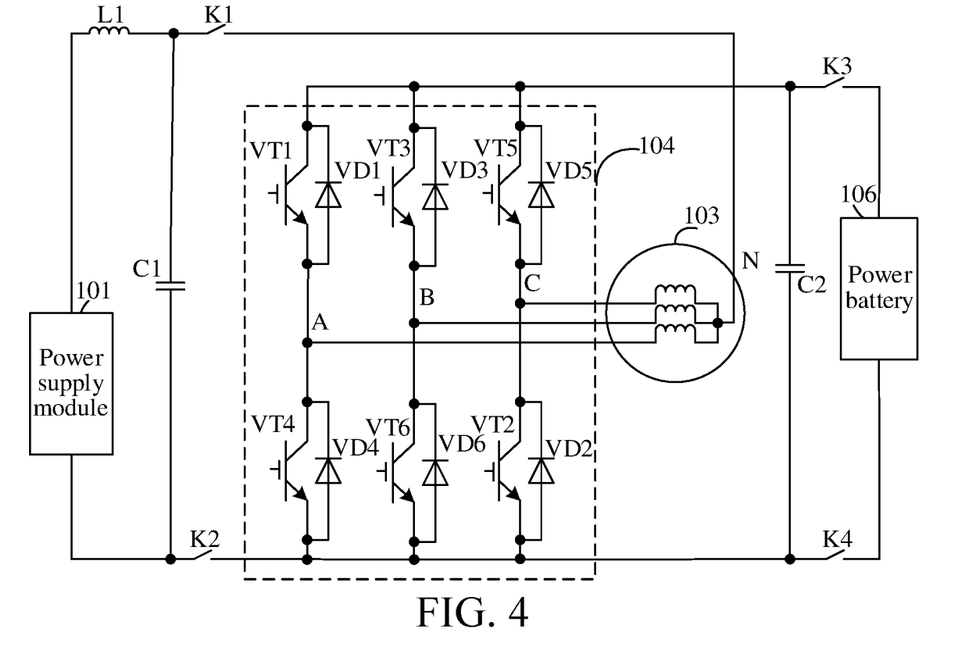
FIG. 4 is another circuit diagram of a motor control circuit according to one embodiment of the present disclosure.

FIG. 4 is another schematic circuit diagram of a motor control circuit according to the present disclosure. A difference from FIG. 3 is as follows: An inductor L1 is connected in series between the switch K1 and the positive electrode of the power supply module 101, and a capacitor C1 is connected in parallel among the power supply module, the switch K1, and the switch K2. The capacitor C1 may be selected based on related local charging regulations, charging protocols, and the like, and a capacitance value can be adjusted based on an actual need. It should be noted that the inductor L1 may be further disposed between the capacitor C1 and the switch K1.

Figure 5:
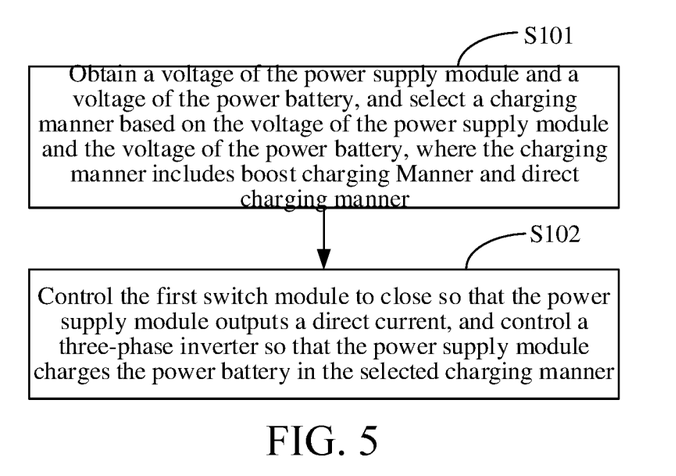
FIG. 5 is a flowchart of a power battery charging method according to another embodiment of the present disclosure.

Another embodiment of the present disclosure provides a power battery charging method, based on the motor control circuit shown in FIG. 5, the charging method includes the following steps.

S101: Obtain a voltage of the power supply module and a voltage of the power battery, and select a charging manner based on the voltage of the power supply module and the voltage of the power battery, where the charging manner includes boost charging manner and direct charging.

S102: Control the first switch module to close so that the power supply module outputs a direct current, and control the three-phase inverter so that the power supply module charges the power battery in the selected charging manner.

In the foregoing steps, as shown in FIG. 1, an execution body is the control module 108, and when the control module 108 detects that the power supply module 101 is connected to the circuit, for example, when a charging terminal is plugged into a direct current charging interface of a vehicle, the control module 108 compares a voltage of the power supply module 101 with a voltage of the power battery 106. A different charging manner is selected to charge the power battery 106 based on a comparison result. When a highest output voltage of the power supply module 101 is not higher than the voltage of the power battery 106, the power battery 106 may be charged in a direct current boost charging manner. Because the three phase coils of the three-phase alternating current motor 103 may store electric energy, the first switch module 102 may be controlled to close, and the three-phase inverter 104 may be controlled, so that the power supply module 101 charges the three phase coils of the three-phase alternating current motor 103, and the power battery 106 is then charged through the power supply module 101 and the three phase coils of the three-phase alternating current motor 103. Because the three phase coils of the three-phase alternating current motor 103 also output a voltage at this time in a discharge process, the voltage outputted by the power supply module 101 is superimposed with the voltage outputted by the three phase coils, so that the voltage of the power supply module 101 is boosted, thereby normally charging the power battery 106. When the control module 108 detects that a highest output voltage of the power supply module 101 is higher than the voltage of the power battery 106, the control module 108 controls the first switch module 102 to close, so that an output voltage of the power supply module 101 is used to directly charge the power battery 106. In the embodiments of the present disclosure, the wire N extends from the three phase coils in the three-phase alternating current motor, and forms different charging and discharging loops with the power battery and the three-phase inverter. When the control module detects that a highest output voltage of the power supply module is not higher than the voltage of the power battery, the original three-phase inverter 104 and three-phase alternating current motor are adopted to boost the voltage of the power supply module before the power battery is charged; or when the control module detects that a highest output voltage of the power supply module is higher than the voltage of the power battery, the voltage of the power supply module is configured to directly charge the power battery. In this case, the power battery can be charged regardless of the voltage of the power supply module, and thereby achieving robust compatibility and adaptability. In addition, no extra external boost circuit needs to be added, which reduces costs of an external circuit.

Further, the selecting a charging manner based on the voltage of the power supply module and the voltage of the power battery includes: selecting the boost charging manner when it is detected that the voltage of the power supply module is not higher than the voltage of the power battery.

The controlling the three-phase inverter so that the power supply module charges the power battery in the selected charging manner includes: controlling the three-phase inverter so that a process of charging three phase coils of the three-phase alternating current motor by the power supply module and a process of discharging the power battery by the power supply module and the three phase coils of the three-phase alternating current motor are alternately performed, to boost a charging voltage of the power supply module before the power battery is charged.

In an implementation, as shown in FIG. 1, the power supply module 101, the first switch module 102, the three-phase alternating current motor 103, and the three-phase inverter 104 form a charging loop, and the power supply module 101, the first switch module 102, and the three-phase alternating current motor 103, the three-phase inverter 104, and the power battery 106 form a discharging loop.

The controlling the three-phase inverter so that a process of charging three phase coils of the three-phase alternating current motor by the power supply module and a process of discharging the power battery by the power supply module and the three phase coils of the three-phase alternating current motor are alternately performed includes: controlling the three-phase inverter 104 to perform alternate closing on the charging loop and the discharging loop.

In this implementation, a neutral wire extends from the three-phase alternating current motor 103, and is connected to the power supply module 101 through the first switch module 102, and may further form the charging loop and the discharging loop in the three-phase alternating current motor 103 with the power supply module 101, the three-phase inverter 104, and the power battery 106 by controlling the three-phase inverter 104. By controlling the alternate closing of the charging loop and the discharging loop, the power battery 106 may also be charged even if the voltage of the power supply module 101 is not higher than the voltage of the power battery 106, thereby achieving robust compatibility and adaptability. In addition, no extra external boost circuit needs to be added, which reduces costs of an external circuit.

For the three-phase inverter 104, in an implementation, the three-phase inverter 104 includes three phase legs, each phase leg includes two power switch units connected in series, and the three phase coils of the three-phase alternating current motor 103 are separately connected to connection points of two power switch units of each phase leg.

The controlling the three-phase inverter so that a process of charging the three phase coils of the three-phase alternating current motor by the power supply module and a process of discharging the power battery by the power supply module and the three phase coils of the three-phase alternating current motor are alternately performed includes:
controlling two power switch units on at least one phase leg of the three-phase inverter 104 to close alternately so that the process of charging the three phase coils of the three-phase alternating current motor 103 by the power supply module 101 and the process of discharging the power battery 106 by the power supply module 101 and the three phase coils of the three-phase alternating current motor 103 are alternately performed.

For the control of the three-phase inverter 104, switching of different phase legs can be controlled for connection as needed to implement the direct current charging function. For example, the phase leg that controls the connection may be any phase leg, any two phase legs, and the three phase legs in the three phase legs, thereby implementing a total of 7 switching charging manners.

Further, the controlling two power switch units to close alternately on at least one phase leg of the three-phase inverter includes: obtaining a quantity of to-be-connected phase legs of the three-phase inverter 104 based on to-be-charged power of the power battery 106, and based on the quantity of to-be-connected phase legs, controlling a corresponding quantity of phase legs to operate.

A quantity of to-be-connected phase legs may be selected based on magnitude of the to-be-charged power of the power battery 106. The to-be-charged power of the power battery 106 may be obtained according to a charging power instruction sent by a battery manager. To control the corresponding quantity of phase legs to operate means to enable a current to flow on the phase legs. That is, the two power switch units in the phase legs close alternately to participate in different current loops. For example, for low-power boost charging, any phase leg may be selected to operate for boost charging. For medium-power boost charging, any two phase legs may be selected to operate for boost charging, and for high-power boost charging, three phase legs may be selected to operate simultaneously for boost charging.

In this implementation, based on the to-be-charged power of the power battery, a corresponding quantity of phase legs are selected to operate for boost charging, and a corresponding control manner is implemented based on the to-be-charged power of the power battery, which improves the charging efficiency of the power battery.

In the first implementation, the obtaining a quantity of to-be-connected phase legs of the three-phase inverter based on to-be-charged power of the power battery, and based on the quantity of to-be-connected phase legs, controlling a corresponding quantity of phase legs to operate includes:
determining that the quantity of to-be-connected phase legs of the three-phase inverter 104 is 1 when it is detected that the to-be-charged power of the power battery 106 is lower than first preset power, and controlling any phase leg in the three phase legs to operate or controlling the three phase legs to operate alternately.

When the control module 108 detects that the to-be-charged power of the power battery 106 is relatively low, a charging need may be met by controlling one of the three phase legs to close. It is assumed that the three phase legs include an A-phase leg, a B-phase leg, and a C-phase leg, and any phase leg in the three phase legs may be controlled to continuously operate, or the three phase legs may be controlled to be switched for operation in turn. To switch the three phase legs for operation in turn means that the three phase legs are to operate in sequence. For example, the A-phase leg is first controlled to operate, and the B-phase leg and the C-phase leg do not operate; then the B-phase leg is controlled to operate, and the A-phase leg and the C-phase leg do not operate; then the C-phase leg is controlled to operate, and the A-phase leg and the B-phase leg do not operate; and then the three phase legs are controlled to be switched in turn, so that heating of the three-phase inverter 104 and the three phase coils is balanced.

In a second implementation, the obtaining a quantity of to-be-connected phase legs of the three-phase inverter based on to-be-charged power of a power battery, and based on the quantity of to-be-connected phase legs, controlling a corresponding quantity of phase legs to operate includes: determining that the quantity of to-be-connected phase legs of the three-phase inverter 104 is 2 when it is detected that the to-be-charged power of the power battery 106 is not lower than the first preset power but lower than second preset power, and controlling any two phase legs in the three phase legs to operate or controlling three groups of two phase legs in the three phase legs to operate in sequence, where the three-phase inverter includes an A-phase leg, a B-phase leg, and a C-phase leg, a first group of two phase legs include the A-phase leg and the B-phase leg, a second group of two phase legs include the A-phase leg and the C-phase leg, and a first group of three phase legs include the B-phase leg and the C-phase leg.

When the control module 108 detects that the to-be-charged power of the power battery 106 is not lower than the first preset power and lower than the second preset power, two of the three phase legs close to meet the charging need, and any two phase legs in the three phase legs may be controlled to continuously operate, and three groups of two phase legs in the three phase legs may also be controlled to be switched for operation in turn. For example, the A-phase leg and the B-phase leg may be considered as the first group of two phase legs, the A-phase leg and the C-phase leg may be considered as the second group of two phase legs, and the B-phase leg and the C-phase leg may be considered as the third group of two phase legs. That is, the first group of two phase legs are first controlled to operate, and the C-phase leg does not operate; then the second group of two phase legs are controlled to operate, and the B-phase leg does not operate; then the third group of two phase legs are controlled to operate, and the A-phase leg does not operate; and then the three groups of two phase legs are controlled to be switched for operation in turn, so that heating of the three-phase inverter 104 and the three phase coils is balanced.

In a second implementation, further, after the determining that the quantity of to-be-connected phase legs of the three-phase inverter is 2 when the control module detects that the to-be-charged power of the power battery is not lower than the first preset power but lower than second preset power, the method further includes: there is a 180-degree difference between phases of PWM control signals sent by the control module 108 separately to the two phase legs.

To reduce overall ripples of a charging circuit, a manner of controlling the switch of the inverter at staggered phases is used, and when only two phase legs are used, a difference between phases of two-phase control signals separately sent to the two phase legs is about 180 degrees. In this case, positive and negative ripples of the two phase coils are superimposed on each other and cancel each other, so that the overall ripples can be greatly reduced.

In a third implementation, the obtaining, by the control module, a quantity of to-be-connected phase legs of the three-phase inverter based on to-be-charged power of the power battery, and based on the quantity of to-be-connected phase legs, controlling a corresponding quantity of phase legs to operate includes: determining that the quantity of to-be-connected phase legs of the three-phase inverter 104 is 3 when the control module 108 detects that the to-be-charged power of the power battery 106 is not lower than the second preset power, and controlling the three phase legs to operate simultaneously.

When the control module 108 detects that the to-be-charged power of the power battery 106 is relatively high, three of the three phase legs close to meet the charging need, and the three phase legs in the three phase legs are controlled to operate simultaneously. Because the three-phase loop is theoretically balanced, the current outputted by the three phase legs is balanced, and heating of the three-phase inverter 104 and the three phase coils is balanced.

In the third implementation, further, after the determining that the quantity of to-be-connected phase legs of the three-phase inverter is 3 when the control module detects that the to-be-charged power of the power battery is not lower than second preset power, the method further includes: sending PWM control signals at the same phase to the three phase legs; or sending PWM control signals at different phases to the three phase legs, where differences between a phase of a PWM control signal of one phase leg and phases of PWM control signals of the other two phase legs are 120 degrees and −120 degrees respectively.

To reduce the overall ripples of the charging circuit, a manner of controlling the switch of the inverter at staggered phases is used, and when all the three phase legs are controlled to operate, a difference between phases of three-phase control signals outputted to the three phase legs is about 120 degrees. In this case, positive and negative ripples of the three phase coils are superimposed on each other and cancel each other, so that the overall ripples may be greatly reduced. A synchronous control manner may also be used, that is, power switches of the three phase legs are simultaneously controlled, synchronously turned on, and synchronously turned off. In this case, three-phase currents simultaneously increase when the power switches are turned on, and simultaneously decrease when the power switches are turned off. As a result, the three-phase currents tend to be equal at any moment, the three-phase synthetic magnetomotive force tends to be zero, the stator magnetic field tends to be zero, and basically, no torque is generated for the motor.

In the third implementation, further, the control module 108 obtains a current value of each phase leg when the three phase legs operate simultaneously, and adjusts a control signal for each phase leg so that average current values of the three phase legs are within the same preset current range.

Occasionally, in an actual circuit, because the three-phase alternating current motor 103 may not necessarily have the same three-phase loop as the motor controller, the three-phase currents are not necessarily equal during open-loop control, and a long-term current difference may become increasingly large, and therefore, independent closed-loop control is required for the three-phase currents, and the average values of the three-phase currents are controlled to be within the same preset balance value accuracy range.

In the third implementation, further, the control module 108 obtains a current value of each phase leg when the three phase legs operate simultaneously, and adjusts a control signal for each phase leg so that the current values of the three phase legs are not exactly the same and a current difference between each two phase legs is less than a preset current threshold.

When independent closed-loop control is performed on the three-phase currents, a one-phase current is controlled to be slightly higher than the other two-phase currents, and the other two-phase currents may be controlled to be two-phase currents with an equal average value or slightly unequal currents, so that a magnetic field generated by the three-phase currents may not be zero but very small, and in this case, motor torque is not zero but very small. In this way, a motor shaft may output small torque on the vehicle, to mesh gears, and reduce jittering and noise caused by torque fluctuation. A value of the current and magnitude of the outputted torque may be determined by controlling values of the three-phase currents based on a need in the actual case.

In an implementation, the following manner can be used to control the alternate closing of the charging loop and the discharging loop: The control module 108 outputs a PWM control signal to the three-phase inverter 104 to perform alternate closing on the charging loop and the discharging loop, obtains the to-be-charged power of the power battery 106, obtains a corresponding current based on the to-be-charged power, compares an actual charging current of the power battery 106 with the corresponding current obtained based on the to-be-charged power, and adjusts a duty cycle of the PWM control signal based on a comparison result, to adjust a current outputted to the power battery 106.

The control module 108 receives the to-be-charged power sent by the battery manager, and then obtains a corresponding current based on the to-be-charged power, and compares the charging current for charging the power battery 106 with the corresponding current obtained based on the to-be-charged power. When the charging current is less than a current value corresponding to the required charging power, an on duty cycle of PWM is adjusted and added; or when the charging current is greater than the current value corresponding to the required charging power, the on duty cycle of the PWM is adjusted and reduced until the charging power is met.

The technical solution of the present disclosure is described in detail below by using a specific circuit structure shown in FIG. 3.

The control steps of the control module 108 specifically include:

Step 1: The control module 108 controls the switches K1, K2, K3, and K4 to close.

Figure 6:
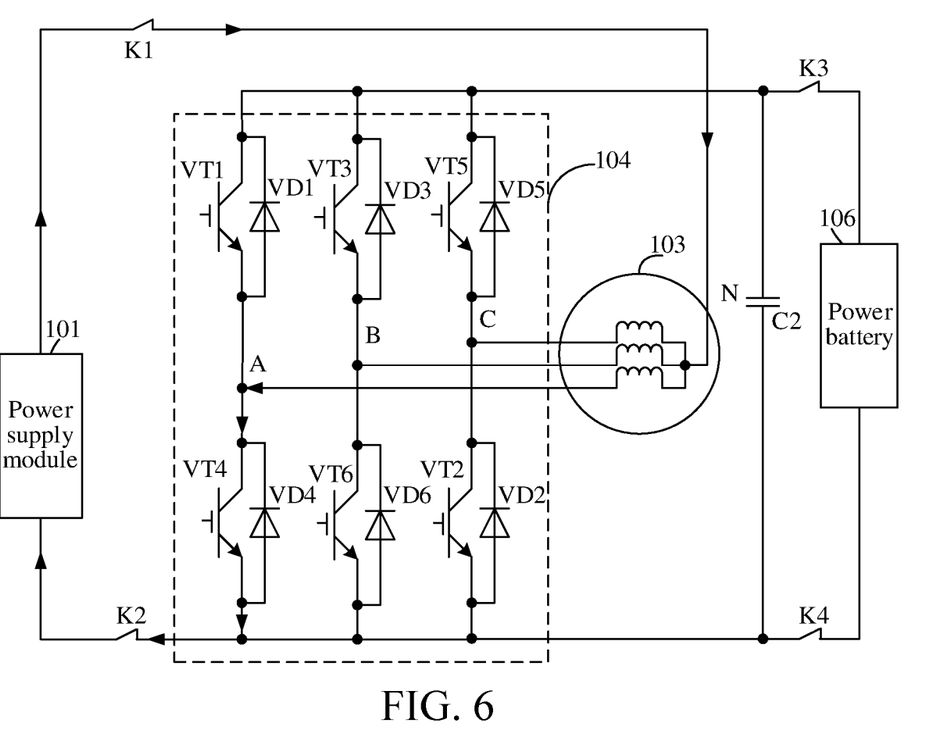
FIG. 6 is a current path diagram of a motor control circuit using a power battery charging method according to another embodiment of the present disclosure.

Step 2: As shown in FIG. 6, the control module 108 sends a PWM control signal to the three-phase inverter 104, and during a connection time period in each PWM control signal cycle, the control module 108 controls connection of a fourth lower phase leg VT4 of a phase A in the three-phase inverter 104; a switch of a first upper phase leg VT1 is disconnected, and upper and lower bridge power switches of the other two phases B and C are all disconnected. In this case, connection of the A-phase coil is implemented, a current is increased, an inductor starts to store energy. An A-phase inductive voltage is positive at the right end and negative at the left end, while the inductive voltages of the phases B and C are opposite to that of the phase A.

Figure 7:
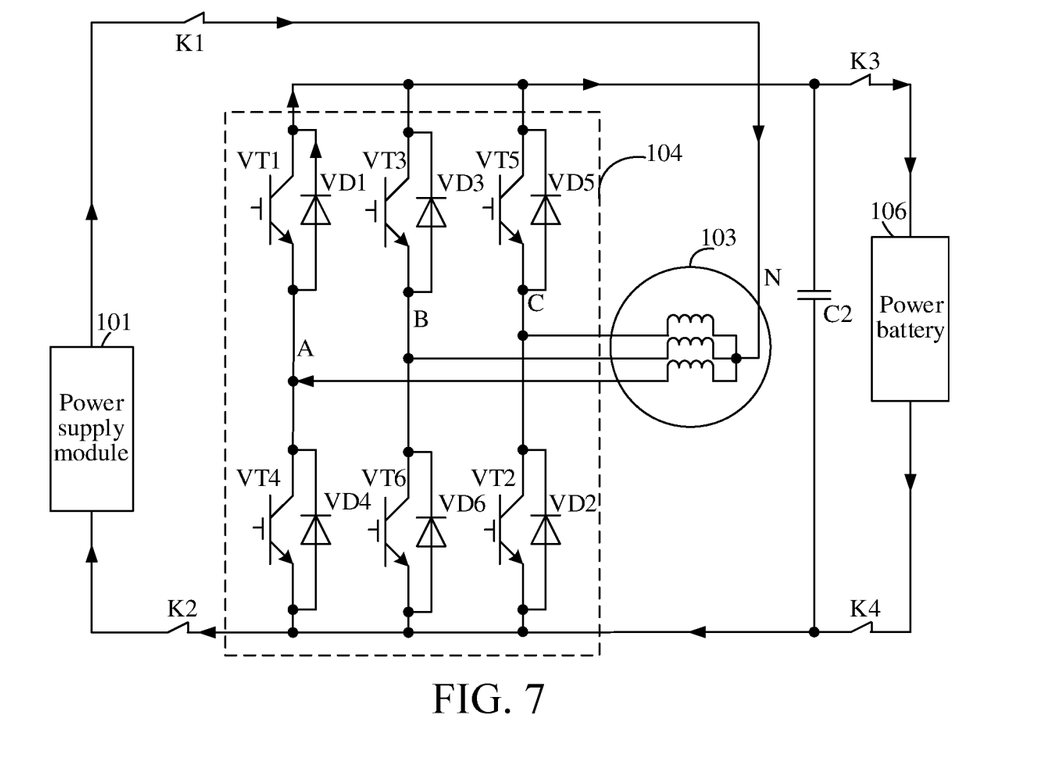
FIG. 7 is another current path diagram of a motor control circuit using a power battery charging method according to another embodiment of the present disclosure.

Step 3: As shown in FIG. 7, during a disconnection time period in each PWM control signal cycle, the control module 108 controls disconnection of the fourth lower phase leg VT4 of the phase A in the three-phase inverter 104; a switch of the first upper phase leg VT1 is connected, and upper and lower bridge power switches of the other two phases B and C are all disconnected. Freewheeling of the A-phase current is implemented by using an upper bridge diode, an inductor starts to discharge, and a current is decreased. In this case, an A-phase inductive voltage is positive at the left end and negative at the right end, while the inductive voltages of the phases B and C are opposite to that of the phase A. The A-phase inductive voltage is superimposed with the voltage of the power supply module 101, to charge the battery at a boosted voltage.

Step 4: The control module 108 collects a charging current for the battery, where when the current is less than a current value corresponding to required charging power, an on duty cycle of PWM is adjusted and added; or when the current is greater than the current value corresponding to the required charging power, the on duty cycle of the PWM is adjusted and reduced until the charging power is met. In addition, three-phase current of the motor is detected to facilitate over-current and over-temperature control.

Step 5. Before the battery is fully charged, repeatedly perform step 2 to step 4; or if the battery is fully charged, control the detection circuit to disconnect the switches K1, K2, K3, and K4.

For ease of understanding, current flow direction arrows in the energy storage period and the discharge period are marked both in FIG. 6 and FIG. 7. The two figures only show a switching method of using the A-phase leg and the A-phase coil for charging. Any one of the B-phase or C-phase leg and any one of the B-phase or C-phase coil may be switched to based on a need, to implement charging, and a charging control manner in which any two phase legs or three phase coils of the three phase legs simultaneously operate may be switched to.

Figure 8:
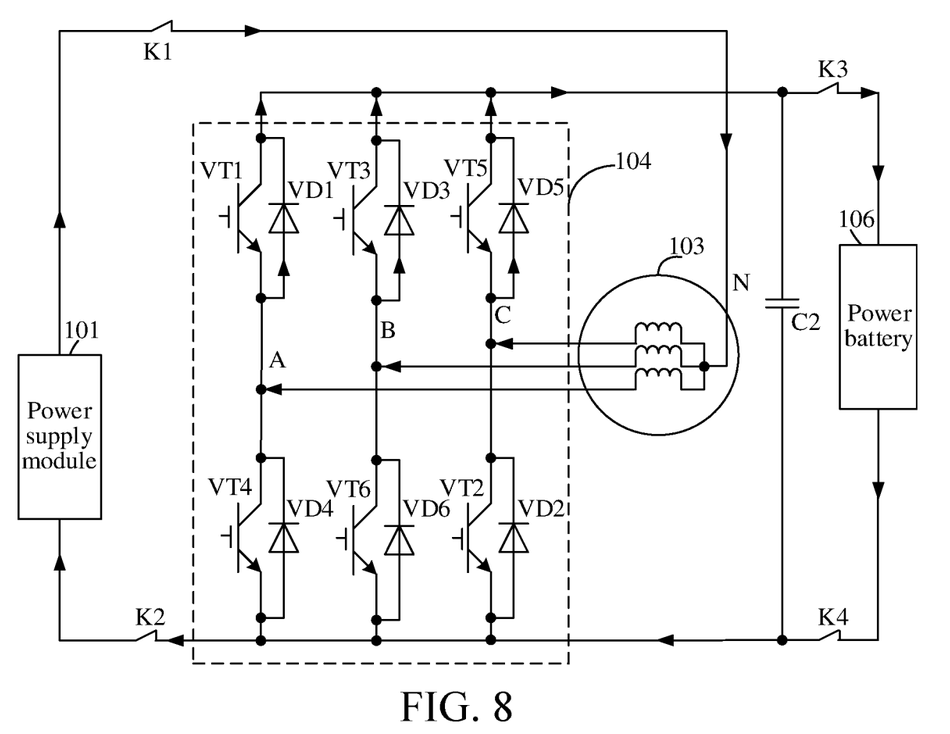
FIG. 8 is still another current path diagram of a motor control circuit using a power battery charging method according to another embodiment of the present disclosure.

It is assumed that a maximum output voltage of the direct current charging pile is higher than the voltage of the power battery 106, and in a specific implementation, FIG. 8 is a schematic circuit diagram of an embodiment of a motor control circuit according to the present disclosure, and a connection method is exactly the same as that in FIG. 3. During direct charging, the three phase coils are naturally connected through the upper bridge diode of the three-phase inverter 104 to form the three-phase charging current. Therefore, unlike boost charging, in this charging manner, different three phase legs and coils cannot be switched. In a specific implementation, to implement the direct charging manner, as shown in FIG. 8, the control steps specifically include:

Step 1: A control module 108 controls all six power switches of a three-phase inverter 104 to be disconnected.

Step 2: The control module 108 controls switches K1, K2, K3, and K4 to close, and the power supply module 101 starts to supply power, and starts to charge the power battery 106 by using the three phase coils of the three-phase alternating current motor 103 and the upper bridge diode of the three-phase inverter 104, where a value of the charging current is controlled by sending charging power or a charging current by the control module 108 to the direct current charging pile.

Step 3: The control module 108 collects a battery charging current and three-phase currents of a motor to control over-current and over-temperature in the charging process.

Step 4: Before the power battery is fully charged, repeatedly perform steps 2 and step 3; or if the power battery is fully charged, the control module 108 disconnects the switches K1, K2, K3, and K4.

For ease of understanding, current flow direction arrows are marked in FIG. 8. The three-phase currents are direct currents, average values thereof are basically the same, and three-phase heating of the motor is basically the same as that of the inverter. In addition, because three-phase winding groups are symmetrical, three-phase synthetic magnetomotive force inside the motor is basically zero in this case, and therefore, the stator magnetic field is basically zero, and basically, no torque is generated for the motor, which helps greatly reduce stress of a drive system.

The direct current charging method of the power battery and the corresponding system and apparatus according to the present disclosure may be applied to but not limited to the foregoing embodiments, and may be applied to both a full electric vehicle, a plug-in hybrid vehicle, and other vehicle types.

Further, another embodiment of the present disclosure provides a vehicle, and the vehicle includes the motor control circuit provided in the foregoing embodiments.

The foregoing embodiments are merely intended for describing the technical solutions of the present disclosure, but not for limiting the present disclosure. Although this application is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of the embodiments of the present disclosure, which being included in the protection scope of the present disclosure.

What is claimed is:

1. A motor control circuit, comprising:
    a first switch module,
    a three-phase inverter, and
    a control module,
    a power supply module, the first switch module, the three-phase inverter, and a three-phase alternating current motor forming a current loop;
    midpoints of three phase legs of the three-phase inverter being respectively connected to three phase coils of the three-phase alternating current motor;
    the three-phase alternating current motor being configured to input or output a current by using a wire N extending from a connection point of the three phase coils;
    the control module being separately connected to the three-phase inverter, the first switch module, the three-phase alternating current motor, and the power supply module;
    the control module being configured to control the three-phase inverter to enable the motor control circuit to receive a voltage of the power supply module and output a direct current;
    the three-phase inverter comprising three phase legs, each phase leg comprising two power switch units connected in series, and the three phase coils of the three-phase alternating current motor being separately connected to connection points of the two power switch units of the phase leg; and
    the control module being configured to control the two power switch units of at least one of the three phase legs in the three-phase converter to close alternately to boost a voltage of the power supply module.

2. The motor control circuit according to claim 1, wherein:
    the motor control circuit further comprises a second switch module,
    the three-phase inverter is connected to a power battery by the second switch module, and
    the second switch module is connected to the control module.

3. The motor control circuit according to claim 2, wherein:
    a first terminal and a second terminal of the first switch module are connected to a positive electrode and a negative electrode of the power supply module,
    a third terminal of the first switch module is connected to the connection point of the three phase coils in the three-phase alternating current motor,
    a fourth terminal of the first switch module is connected to a second terminal of the three-phase inverter and a second terminal of the second switch module,
    a first terminal of the three-phase inverter is connected to a first terminal of the second switch module, and
    a third terminal and a fourth terminal of the second switch module are connected to a positive electrode and a negative electrode of the power battery.

4. The motor control circuit according to claim 2, wherein:
    the first switch module comprises a first switch and a second switch,
    the second switch module comprises a third switch and a fourth switch,
    a first terminal and a second terminal of the first switch are respectively the first terminal and the third terminal of the first switch module,
    a first terminal and a second terminal of the second switch are respectively the second terminal and the fourth terminal of the first switch module,
    a first terminal and a second terminal of the third switch are respectively the first terminal and the third terminal of the second switch module, and
    a first terminal and a second terminal of the fourth switch are respectively the second terminal and the fourth terminal of the second switch module.

5. The motor control circuit according to claim 1, wherein:
    the first switch module is the first switch, and the first switch is connected between the positive electrode of the power supply module and the connection point of the three phase coils of the three-phase alternating current motor; or
    the first switch module is the second switch, and the second switch is connected between the negative electrode of the power supply module and the second terminal of the three-phase inverter.

6. The motor control circuit according to claim 2, wherein:
    the second switch module is the third switch, and the third switch is connected between the first terminal of the three-phase inverter and the positive electrode of the power battery; or
    the second switch module is the fourth switch, and the fourth switch is connected between the second terminal of the three-phase inverter and the negative electrode of the power battery.

7. A power battery charging method for a motor control circuit including a first switch module, a three-phase inverter, a control module, wherein a power supply module, the first switch module, the three-phase inverter, and a three-phase alternating current motor form a current loop; midpoints of three phase legs of the three-phase inverter being respectively connected to three phase coils of the three-phase alternating current motor, the three-phase alternating current motor is configured to input or output a current by using a wire N extending from a connection point of the three phase coils, the control module is separately connected to the three-phase inverter, the first switch module, the three-phase alternating current motor, and the power supply module, the control module is configured to control the three-phase inverter to enable the motor control circuit to receive a voltage of the power supply module and output a direct current; the three-phase inverter comprises three phase legs, each phase leg comprises two power switch units connected in series, and the three phase coils of the three-phase alternating current motor are separately connected to connection points of the two power switch units of the phase leg; and the control module is configured to control the two power switch units of at least one of the three phase legs in the three-phase converter to close alternately to boost a voltage of the power supply module, wherein the charging method comprises:

obtaining a voltage of the power supply module and a voltage of a power battery, and selecting a charging manner based on the voltage of the power supply module and the voltage of the power battery, wherein the charging manner comprises a boost charging manner and a direct charging manner; and controlling the first switch module to close so that the power supply module outputs a direct current, and controlling the three-phase inverter so that the power supply module charges the power battery in the selected charging manner.

8. The power battery charging method according to claim 7, wherein the selecting a charging manner based on the voltage of the power supply module and the voltage of the power battery comprises:

selecting the boost charging manner when it is detected that a highest output voltage of the power supply module is not higher than the voltage of the power battery, wherein the controlling the three-phase inverter so that the power supply module charges the power battery in the selected charging manner comprises:

controlling the three-phase inverter so that a process of charging the three phase coils of the three-phase alternating current motor by the power supply module and a process of discharging the power battery by the power supply module and the three phase coils of the three-phase alternating current motor are alternately performed, to boost a charging voltage of the power supply module before the power battery is charged.

9. The power battery charging method according to claim 8, wherein the power supply module, the first switch module, the three-phase alternating current motor, and the three-phase inverter form a charging loop, and the power supply module, the first switch module, the three-phase alternating current motor, the three-phase inverter, and the power battery form a discharging loop; and the controlling the three-phase inverter so that a process of charging the three phase coils of the three-phase alternating current motor by the power supply module and a process of discharging the power battery by the power supply module and the three phase coils of the three-phase alternating current motor are alternately performed comprises:

controlling the three-phase inverter to perform alternate closing on the charging loop and the discharging loop.

10. The power battery charging method according to claim 8, wherein:

the controlling the three-phase inverter so that a process of charging the three phase coils of the three-phase alternating current motor by the power supply module and a process of discharging the power battery by the power supply module and the three phase coils of the three-phase alternating current motor are alternately performed comprises:

controlling two power switch units on at least one phase leg of the three-phase inverter to close alternately so that the process of charging the three phase coils of the three-phase alternating current motor by the power supply module and the process of discharging the power battery by the power supply module and the three phase coils of the three-phase alternating current motor are alternately performed.

11. The power battery charging method according to claim 10, wherein the controlling two power switch units on at least one phase leg of the three-phase inverter to close alternately comprises:

obtaining a quantity of to-be-connected phase legs of the three-phase inverter based on to-be-charged power of the power battery, and based on the quantity of to-be-connected phase legs, controlling a corresponding quantity of phase legs to operate.

12. The power battery charging method according to claim 10, wherein the controlling two power switch units on at least one phase leg of the three-phase inverter to close alternately comprises:

controlling one phase leg in the three phase legs to operate or controlling the three phase legs to operate alternately.

13. The power battery charging method according to claim 10, wherein the controlling two power switch units on at least one phase leg of the three-phase inverter to close alternately comprises:

controlling any two phase legs in the three phase legs to operate or controlling three groups of two phase legs in the three phase legs to operate in sequence, wherein the three-phase inverter comprises an A-phase leg, a B-phase leg, and a C-phase leg, a first group of two phase legs comprise the A-phase leg and the B-phase leg, a second group of two phase legs comprise the A-phase leg and the C-phase leg, and a third group of two phase legs comprise the B-phase leg and the C-phase leg.

14. The power battery charging method according to claim 13, wherein there is a 180-degree difference between phases of PWM control signals sent by the control module separately to the two phase legs.

15. The power battery charging method according to claim 10, wherein the controlling two power switch units on at least one phase leg of the three-phase inverter to close alternately comprises:

controlling the three phase legs to operate simultaneously.

16. The power battery charging method according to claim 15, the method further comprising:

sending PWM control signals at the same phase to the three phase legs; or sending PWM control signals at different phases to the three phase legs, wherein differences between a phase of a PWM control signal of one phase leg and phases of PWM control signals of the other two phase legs are 120 degrees and −120 degrees respectively.

17. A vehicle, comprising:
a motor control circuit, wherein the motor control circuit comprises:
a first switch module, a three-phase inverter, and a control module, wherein:
a power supply module, the first switch module, the three-phase inverter, and a three-phase alternating current motor form a current loop;

midpoints of three phase legs of the three-phase inverter are respectively connected to three phase coils of the three-phase alternating current motor;

the three-phase alternating current motor is configured to input or output a current by using a wire N extending from a connection point of the three phase coils;

the control module is separately connected to the three-phase inverter, the first switch module, the three-phase alternating current motor, and the power supply module;

the control module is configured to control the three-phase inverter to enable the motor control circuit to receive a voltage of the power supply module and output a direct current;

the three-phase inverter comprises three phase legs, each phase leg comprises two power switch units connected in series, and the three phase coils of the three-phase alternating current motor are separately connected to connection points of the two power switch units of the phase leg; and the control module is configured to control the two power switch units of at least one of the three phase legs in the three-phase converter to close alternately to boost a voltage of the power supply module.

18. The vehicle according to claim 17, wherein:

the motor control circuit further comprises a second switch module, the three-phase inverter is connected to a power battery by the second switch module, and the second switch module is connected to the control module.

* * * * *